Patented Feb. 6, 1951

2,540,938

UNITED STATES PATENT OFFICE 2,540,938

N-SUBSTITUTED DIAMINES AND PREPARATION OF THE SAME

Harry de V. Finch, El Cerrito, and Seaver A. Ballard, Orinda, Calif., assignors to Shell Development Company, San Francisco, Calif., a corporation of Delaware No Drawing. Application July 7, 1947, Serial No. 759,472

9 Claims. (Cl. 260—583)

This invention relates to amines and to the preparation of amines. More particularly the present invention relates to diamines wherein the amino groups are attached to different atoms in a chain of carbon atoms, and to a process for the preparation of N-substituted diamines of the stated character. The invention relates still more particularly to a process for converting unsaturated 1,3-diamines in which one of the amino groups is bonded to an olefinic carbon atom at the end of a chain of carbon atoms which includes the carbon atom to which the second amino group is attached, to unsaturated and to saturated diamines which differ essentially therefrom in the identity of the terminal groups or atoms that are bonded to at least one of the amino nitrogen atoms. Although in its broadest concepts not limited thereto, the invention is of particular value for the preparation of diamines in which at least one of the amino nitrogen atoms is a secondary or a teriary amino nitrogen atom and in which the two amino groups differ from each other in the number of the hydrogen atoms to which the respective nitrogen atoms are bonded.

The methods that have been employed heretofore for the synthesis of diamines have in most cases involved application of the widely-known reactions that are generally applicable to the preparation of amines, particularly monoamines. These well-known reactions include, among others, the conversion of aliphatic halides to amines by reaction with ammonia or an amine, the conversion of nitroparaffins and of nitrogen derivatives, e. g., oximes, hydrazones, etc. of aldehydes and ketones to amines by reduction, the reduction of cyanides, the phthalimide synthesis, and the direct catalytic reaction between an alcohol and ammonia. In certain cases special methods have been proposed for the synthesis of diamines. However, these special methods frequently are not applicable to purposes other than their specific objects, and they frequently call for the use of special raw materials or of specialized manipulative techniques that would render them of doubtful value as widely applicable methods for the preparation of diamines.

When it is desired to prepare a diamine in which the two amino groups differ in the identity of the terminal groups or atoms that are attached to the respective amino nitrogen atoms, the foregoing generally applicable methods are less effective, in some cases because of their limitation to the preparation only of primary amines, and in other cases because of the multiplicity of products that is obtained when one substitutes for the single amine or the ammonia that normally would be employed as the nitrogenous reactant, the mixture of nitrogenous reactants that would be required to form a diamine in which the amino groups differ from each other. An alternative approach, which comprises introducing the two amino groups into the molecule by successive reactions, ordinarily involves a sufficient number of intermediate steps for the preparation of the necessary intermediate compounds, to render it highly uneconomical and applicable only in special cases.

The present invention provides a direct, commercially applicable method for the synthesis of diamines of the herein defined character in which at least one of the amino nitrogen atoms is a secondary or a tertiary amino nitrogen atom, and in which the two amino groups differ from each other. The process is highly adapted to the preparation of diamines wherein each amino group occupies a predetermined position in the molecule; the formation of undesired by-products is minimized, and the formation of a mixture of isomeric diamines, such as would be formed in certain of the prior methods referred to above, is substantially avoided. It is possible to prepare by means of the present process, a number of N-substituted 1,3-diamines that heretofore could have been prepared only with difficulty, if at all.

Broadly stated, the process to which the present invention relates comprises reacting a 1,3-diamine containing an amino group that is bonded to an olefinic carbon atom that is at the end of a chain of carbon atoms which includes the carbon atom to which the second amino group is attached, the two amino groups most conveniently being similar, with a compound containing an amino group that is directly attached to an atom of hydrogen and that differs in substitution from the amino group at the olefinic carbon atom in the diamine. According to the process of the invention, there is effected interchange of at least the amino group that is attached to the olefinic carbon atom in the diamine reactant with the said amino group of the second-mentioned reactant. Although it has not been found possible in all cases to isolate the immediate products of the interchange reaction, the immediate result of the reaction appears to be the formation of an unsaturated diamine in which the amino group that is bonded to the olefinic carbon atom corresponds to the said amino group of the second-mentioned reactant, or the "donor reactant" as it may, and occasionally will be referred to hereinafter for purposes of clarity and brevity. According to one embodiment of the invention, as when the interchange reaction is effected between an unsaturated diamine of the above-defined character and a primary or a secondary organic monoamine, the unsaturated diamine that is formed by the interchange reaction may be recovered from the reaction mixture as a valuable and useful product of the process. In other cases, particularly when ammonia is employed as the second amine reactant, the initial products of the interchange reaction appear to be unstable and not subject to isolation in the pure state. In these cases, the invention provides for the hydrogenation in situ of the initial products to form saturated diamines, such as alkanediamines in which one of the amino nitrogen atoms is secondary or tertiary and the other is primary, by simultaneous treatment of the reaction mixture with hydrogen in the presence of a hydrogenation catalyst under conditions which favor hydrogenation reaction. Corresponding hydrogenation in situ of the unsaturated diamines formed by the interchange reaction when a primary or a secondary amine is employed as the second reactant, also is provided as one of the preferred embodiments of the invention.

The process of the present invention is particularly valuable for the preparation of 1,3-propenediamines and 1,3-propanediamines wherein at least one of the amino nitrogen atoms is secondary or tertiary and the two amino groups differ from each other, and substitution products of such diamines wherein at least one of the hydrogen atoms of the propene (or the propane) residue has been substituted by an organic group such as an aromatic, an aliphatic, an alicyclic or a heterocyclic group. When the process is thus applied the essential interchange reaction which occurs is thought to be as follows:

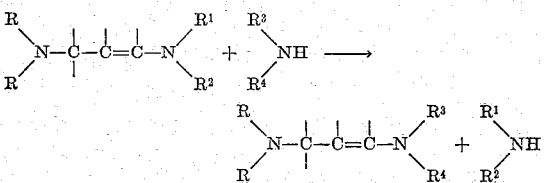

Further interchange whereby both of the amino groups represented by —NR₂ and —NR¹R² are replaced by the amino group —NR³R⁴ of the donor reactant is included within the broader concepts of the invention. In this equation, each R and R¹ represents either a hydrogen atom or a hydrocarbon group and R² represents a hydrocarbon group. The groups or atoms represented by R, R¹, and R² may be the same or different. R³ and R⁴ represent either hydrogen atoms or hydrocarbon groups, R³ and R⁴ being either the same or different. R¹, R², R³, and R⁴ are of such a character that the groups —NR¹R² and —NR³R⁴ differ from each other. The groups —NR₂ and —NR¹R² may be the same or different, although it generally is most convenient and preferable to employ as the diamine reactant an unsaturated diamine in which these groups are the same.

As indicated above, in many cases the unsaturated diamine that is produced by the interchange reaction may be isolated from the reaction mixture in a substantially pure state. When, in accordance with one embodiment of the invention, the unsaturated diamine reactant is treated simultaneously with a compound containing an amino group that is directly attached through the nitrogen atom to an atom of hydrogen and that differs in substitution from the amino group that is bonded in the diamine to the olefinic carbon atom, and with hydrogen in the presence of a hydrogenation catalyst under conditions which favor hydrogenation reaction, the following overall reaction apparently occurs:

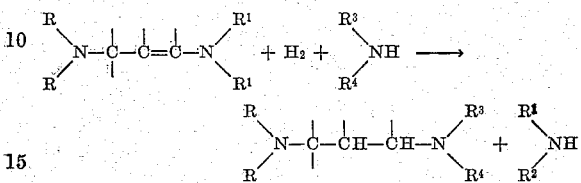

In this equation, R, R¹, R², R³ and R⁴ have their previous significance. Although the existence of other possible reaction mechanisms is not precluded, and it is not desired to limit the invention according to any particular theory, it appears probable that the interchange reaction described in the preceding equation first takes place, and that the unsaturated diamine formed by the interchange reaction is hydrogenated at the olefinic bond to form the saturated diamine appearing on the right hand side of the latter equation.

When reference is made herein to the second reactant, or the donor reactant, as a compound containing an amino group that is directly attached through the nitrogen atom to an atom of hydrogen, the term "amino group" is employed in its broad sense in that it is intended to include both the unsubstituted amino group —NH₂ and the amino groups wherein one or both of the hydrogen atoms may have been replaced by organic radicals, such as hydrocarbon radicals, i. e., it is intended to designate the monovalent group —NR³R⁴ in which the nitrogen atom is attached to three separate atoms by univalent bonds and in which each R³ and R⁴ represents either a hydrogen atom or a hydrocarbon group such as an aromatic, an aliphatic, or an alicyclic hydrocarbon group. Reference to compounds in which the amino group is attached to an atom of hydrogen designates those compounds in which the free valency in the group —NR³R⁴ is satisfied by an atom of hydrogen. When both R³ and R⁴ represent atoms of hydrogen, the formula HNR³R⁴ refers particularly to ammonia (NH₃). When one of R³ and R⁴ represents a hydrocarbon group and the other represents the hydrogen atom, the formula HNR³R⁴ refers particularly to the primary organic amines, and, similarly, when both R³ and R⁴ signify hydrocarbon groups, the formula HNR³R⁴ refers particularly to the secondary organic amines. A wide variety of primary and secondary organic amines may be employed in the process of the present invention, including saturated aliphatic amines, unsaturated aliphatic amines, aromatic amines, alicyclic amines and heterocyclic amines. R³ and R⁴ may be joined together to form a heterocyclic ring including the nitrogen atom of the amino group, as in piperidine and similar heterocyclic bases in which the nitrogen atom in the heterocyclic ring is attached to three separate atoms including an atom of hydrogen. Among the amines which may be employed in the process of the invention as the second amino reactant are included, among others, monoalkyl amines, dialkyl amines, monoalkenyl amines, dialkenyl amines, N-alkyl alkenylamines, aryl amines, diaryl amines, N-alkyl arylamines, N-alkenyl arylamines, cycloalkyl amines, heterocyclic amines, and the like.

Specific amines which may be employed include, among others, methylamine, dimethylamine, cyclopentylamine, N-methylcyclopentylamine, allylamine, N-ethylallylamine, N-methylaniline, aniline, piperidine, 3-cyclohexenylamine, dicrotylamine, octylamine, N-decyloctylamine, N-allylaniline, furfuryl amine, methallylamine, octadecylamine, hexylamine, dihexylamine, N-octylaniline, benzylamine, and the like and homologous and analogous primary and secondary organic amines. The hydrocarbon group or groups attached to the amino nitrogen atom may be hydrocarbon groups which contain one or more substituents, provided such substituents do not interfere in any way with the successful practice of the process of the invention, such as one or more atoms of halogen, or groups including, for example, —O—, —OH, —S—, —NH—, —OC—, —SH, —OC—R, and the like, or, more preferably, they may be unsubstituted hydrocarbon groups.

As stated above, the process of the present invention is particularly valuable for the preparation of 1,3-propenediamines and 1,3-propane-diamine and C-substitution products thereof, in which at least one of the amino nitrogen atoms is secondary or tertiary in character. N-substituted 1,3-propenediamines which may be employed as the unsaturated diamine reactant in the present process may be prepared by any suitable known or special method. 1-alkene-1,3-diamines wherein both of the nitrogen atoms are secondary amino nitrogen atoms and the terminal groups that are attached to the amino nitrogen atoms are aliphatic hydrocarbon groups containing at least three carbon atoms or cycloaliphatic hydrocarbon groups, may be prepared conveniently by reacting an alpha,beta-olefinic aldehyde with a normally liquid-to-solid primary organic monoamine, according to the apparent equation:

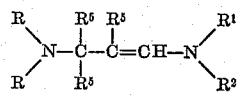

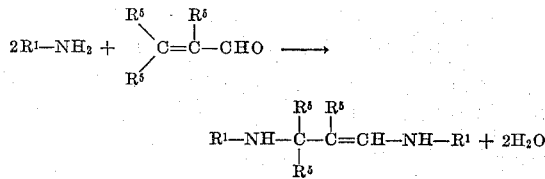

in which $R^1$ represents an aliphatic hydrocarbon group containing at least three carbons or a cycloaliphatic hydrocarbon group, and each $R^5$ represents either a hydrogen atom or an alkyl group. This reaction and a method for effecting it forms in part the subject matter of the copending application, Serial No. 759,474, filed July 7, 1947. Unsaturated diamines may be prepared according to the foregoing method by treating the unsaturated aldehyde with a normally liquid-to-solid aliphatic or cycloaliphatic primary amine at a temperature desirably not exceeding about +20° C. and preferably within the range of from about —30° C. to about +20° C., in the liquid state in the presence of a substantial excess of the monoamine reactant under substantially anhydrous conditions. The unsaturated aldehyde and the amine may be mixed in proportions of from about 2 to 5 or more moles of the amine per mole of the unsaturated aldehyde and the mixture maintained at a reaction temperature within the stated range until the reaction is completed. A solid non-acidic desiccating agent, such as calcium oxide, magnesium oxide, potassium carbonate, activated alumina, or the like, may be contacted with the reaction mixture if desired, to favor the reaction. After completion of the reaction, the unsaturated diamine may be recovered from the reaction mixture in any suitable manner, fractional distillation being a generally applicable and preferred method of effecting the recovery.

Generally speaking, the unsaturated 1,3-diamines which may be employed as the diamine reactant in the process of the present invention may be represented by the structural formula

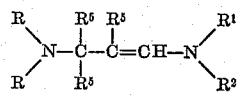

in which R and $R^1$ represent either hydrogen atoms or hydrocarbon groups, $R^2$ represents a hydrocarbon group, the groups —$NR_2$ and —$NR^1R^2$ preferably being the same, and each $R^5$ represents either a hydrogen atom or a hydrocarbon group, such as an aliphatic, an alicyclic or an aromatic hydrocarbon group. Illustrative groups which may be represented by R, $R^1$, $R^2$, and $R^5$ include, for example, alkyl groups, e. g., methyl, ethyl, propyl, isopropyl, the butyls, the pentyls, and their straight-chain and branched-chain homologs, unsaturated aliphatic groups, such as allyl, methallyl, crotyl, 2-pentenyl, 2-methyl-2-pentenyl, 2-pentynyl, and homologs and analogs thereof, alicyclic groups, such as the phenyl group and the substituted phenyl groups, and the cycloaliphatic groups, such as cyclohexyl, cyclopentyl, cyclohexenyl, and homologous and analogous groups. The process of the invention is particularly effective when there is employed as the diamine reactant one in which the groups —$NR_2$ and —$NR^1R^2$ each contain from 2 to about 20 carbon atoms. The process is highly effective when the groups represented by R, $R^1$, and $R^2$ are non-aromatic, i. e., aliphatic or cycloaliphatic. It is particularly preferred to employ the aliphatic diamines within the present more general class, i. e., the diamines in which there are present only aliphatic (or cycloaliphatic) carbon-to-carbon bonds. The process may be executed with particular efficacy when the groups —$NR_2$ and —$NR^1R^2$ correspond to the amino groups of readily volatile amines $HNR_2$ and $HNR^1R^2$, e. g., amines having boiling points under atmospheric pressure up to about 200° C.

Particularly valuable conversions which may be effected by means of the present process include:

A. The conversion of ditertiary unsaturated diamines,

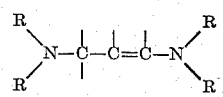

in which each R represents a hydrocargon group, to:

1. Ditertiary unsaturated diamines.

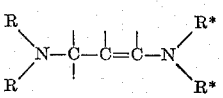

in which the groups —NRR and —NR*R* differ.

2. Tertiary-secondary unsaturated diamines

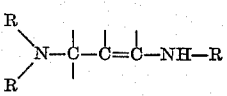

3. Tertiary-primary saturated diamines

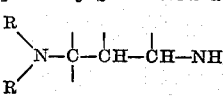

B. Disecondary unsaturated diamines

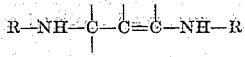

in which each R represents a hydrocarbon group, to:

1. Tertiary-secondary unsaturated diamines,

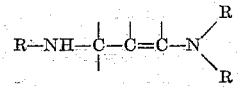

2. Disecondary unsaturated diamines,

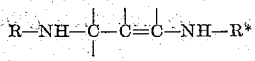

in which R and R* represent different hydrocarbon groups.

3. Secondary-primary saturated diamines

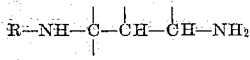

We have found that when the nitrogen atom of the monoamine reactant is bonded to the same number of hydrogen atoms as is each of the nitrogen atoms of the diamine, interchange of both of the amino groups of the diamine with the amino group of the monoamine also may occur. We have found further that when the nitrogen atom of the monoamine reactant is attached to a greater number of hydrogen atoms than is each nitrogen atom of the diamine, there is a substantially lesser tendency towards interchange of both of the amino groups of the diamine reactant.

The unsaturated diamines which may be prepared by the present process may be hydrogenated in situ to form the corresponding saturated diamines, or they may be recovered from the reaction mixture as useful products of the process.

The foregoing conversions of unsaturated diamines to unsaturated diamines which differ therefrom in the identity of the terminal groups or atoms that are attached to at least one of the amino nitrogen atoms, may be effected by heating a mixture of the unsaturated diamine with an organic primary or secondary amine that contains the amino group to be interchanged with the amino group of the diamine, under conditions which favor the desired reaction. The selection of the organic primary or secondary monoamine will be based on the character of the amino group it is desired to introduce into the unsaturated diamine, according to the general equation for the interchange reaction presented previously herein. The desired reaction may be effected by heating a mixture of the two reactants in the liquid state at a temperature which is effective in causing the desired interchange reaction to take place. Temperatures in excess of about 40° C. are generally suitable, a preferred range of temperatures being from about 50° C. to about 125° C. Higher temperatures frequently may be employed, up to, say, 200° C., although temperatures which would promote excessive decomposition, polymerization, or other side reactions, should be avoided. Lower temperatures also may be employed in suitable cases, temperatures as low as −25° C. at times being suitable. The relative amounts of the unsaturated diamine and the organic primary or secondary monoamine that are employed may be varied within reasonable limits, although the interchange reaction is favored by the presence of a moderate excess of the monoamine, or the "donor reactant." Generally speaking, molar ratios of unsaturated diamine to the primary or secondary monoamine of from about 2/1 to 1/20 are suitable. A preferred range comprises mole ratios of from about 1/1 to about 1/10.

If desired, an inert solvent, such as an inert organic solvent may be included in the reaction mixture. Solvents which may be employed include alcohols, ethers, esters, aliphatic hydrocarbons, aromatic hydrocarbons, and the like. When both the reactants and the reaction products in the interchange reaction are normally liquid at the reaction temperature and mutually soluble, the reaction mixture conveniently may consist of the selected reactants. If the reaction mixture in the absence of a solvent does not form a homogeneous mixture, a sufficient amount of an inert solvent advantageously may be included in the mixture to render the several ingredients mutually compatible, or soluble. Larger amounts of solvent may be employed, if desired. The interchange reaction is not dependent upon the use of a catalyst. Because of the resultant simplification in the recovery of the products, the reaction desirably may be effected in the absence of any added materials having catalytic activity in the interchange reaction. However, the invention does not exclude as a matter of necessity the presence of materials having catalytic activity in the interchange reaction, such as small amounts of acids, bases, acidic or basic salts, or the like.

According to the invention, the interchange reaction may be effected in any suitable manner and in any suitable type of apparatus. The unsaturated diamine and the organic primary or secondary amine thus may be mixed in a suitable reaction vessel, and heated to a reaction temperature for a time sufficient to cause appreciable interchange of at least one of the amino groups of the unsaturated diamine with the amino group of the second nitrogenous reactant. The reaction mixture may be maintained under either atmospheric pressure or under pressures above or below atmospheric pressures. It has been found that the desired reaction may be favored by withdrawing from the reaction mixture, either continuously or intermittently, the organic monoamine formed in the reaction. One particularly convenient method of accomplishing this comprises effecting the reaction at the reflux temperature of the reaction mixture and substantially as rapidly as it is formed separating, as by fractional condensation, the monoamine product of the reaction from the evolved vapors prior to their return in condensed form to the reaction mixture. If it is desired to maintain the reaction mixture at a temperature within a range lower than the reflux temperature of the mixture under atmospheric pressure, the pressure over the mixture may be reduced appropriately, the necessary modifications in apparatus, etc., for accomplishing this being such that they will be readily apparent to those skilled in the art. Although the foregoing represents a preferred manner in which the process of the invention may be executed, it will be understood that other methods may be employed to remove from the reaction mixture the monoamine as it is formed by the interchange reaction. It may be removed in appropriate cases by extractive and/or azeotropic distillation, by continuous introduction of the monoamine reactant accompanied by continuous removal of total monoamines from the reaction mixture, and by other applicable methods.

If the unsaturated diamine that is formed by the interchange reaction is desired as the ultimate product, the components of the mixture may be separated from each other in any suitable manner. Fractional distillation is eminently satisfactory for the purpose, although other methods including treatment with selective solvents, fractional crystallization, adsorption, and similar methods may be employed if desirable.

According to one embodiment of the invention, an unsaturated diamine of the herein defined character may be treated simultaneously with a suitable compound containing an amino group that is directly attached through the nitrogen atom to an atom of hydrogen, and with hydrogen in the presence of a hydrogenation catalyst under conditions which favor hydrogenation reaction. When executed in this manner, the process is highly efficaceous for the preparation of saturated diamines, such as 1,3-alkanediamines, in which one of the amino nitrogen atoms is a primary or secondary amino nitrogen atom, and in which the two amino groups differ in the identity of the terminal groups or atoms that are attached to the amino nitrogen atoms. The simultaneous treatment may be accomplished by contacting the unsaturated diamine reactant with an active hydrogenation catalyst in the presence of the donor reactant and subjecting the mixture to the action of molecular hydrogen under suitable conditions of elevated temperature and superatmospheric pressure of hydrogen. When the second amine reactant is a liquid at the reaction temperature, the two nitrogenous reactants may be mixed together and contacted in the liquid state with the hydrogenation catalyst while the mixture is subjected to the action of gaseous hydrogen under hydrogenation conditions. If the donor reactant is normally gaseous at the reaction temperature, e. g., ammonia or a lower aliphatic amine, it may be dissolved in a suitable inert solvent and mixed with the diamine in the form of a solution, or it may be introduced in the gaseous state directly into the reaction vessel in suitable amounts.

As the hydrogenation catalyst, there may be employed any of the catalytically active metals or compounds of metals known to the art and generally referred to as hydrogenation catalysts, including, for example, the noble metals gold, platinum, palladium, etc., and base metals and compounds thereof and mixtures thereof, such as nickel, cobalt, tungsten, molybdenum, cerium, thorium, chromium, zirconium, and the like and their oxides and/or their sulfides. Alloys or mixtures containing one or more of such metals, also may be employed. It is preferable to employ an effective catalyst that is relatively inexpensive and that is relatively easy to prepare and to regenerate or to reactivate. The base metal hydrogenation catalysts, consisting of or comprising a base metal may be employed with particular advantage, with the metal present either in a finely divided state and suspended in the reaction mixture, or deposited on an inert or catalytically active supporting material such as pumice, charcoal, silica gel, kieselguhr, or the like. Pyrophoric nickel, cobalt, and iron may be employed with particular advantage as hydrogenation catalysts because they possess an initial activity providing rapid reaction at conditions readily obtainable in practice, and because they may be easily prepared and regenerated or reactivated. Particularly favorable results may be obtained when there is employed as the hydrogenation catalyst in the present process the active catalyst known in the art as Raney nickel hydrogenation catalyst prepared according to the disclosures of the Raney patent, U. S. 1,628,190.

In accordance with the present invention, the unsaturated diamine may be treated simultaneously with the second nitrogenous reactant, i. e., with ammonia or a primary or a secondary amine, and with hydrogen in the presence of an effective amount of the hydrogenation catalyst under conditions of elevated temperature and superatmospheric pressures of hydrogen which favor the desired reaction. The amount of the hydrogenation catalyst that most advantageously may be employed depends to a certain extent upon the activity of the particular catalyst that is used, and in part upon the particular nitrogenous reactants that are involved. Amounts of the hydrogenation catalyst from about 2 to about 20 per cent by weight of the reaction mixture are generally suitable, although larger or smaller amounts may be employed if desirable. When Raney nickel catalyst is employed as the hydrogenation catalyst, amounts from about 2 to about 10 per cent by weight of the reaction mixture generally are highly efficacious. The temperature that is employed is not highly critical, provided it is sufficiently elevated so that the desired reaction will take place. Temperatures of from about 50° C. to about 200° C. may be employed, a particularly suitable range being from about 70° C. to about 130° C. The hydrogen pressure should be superatmospheric. Pressures of hydrogen of from about 500 to 10,000 pounds per square inch or more, up to the tensile limit of the reaction vessel, may be employed. Because of the desirable simplification in the requirements as to the necessary equipment, the lower pressures, say from about 500 to about 2,000 pounds per square inch, are preferred.

The simultaneous treatment of the unsaturated diamine with the second nitrogenous reactant and the hydrogen may be effected in any suitable manner and in any suitable type of apparatus. The treatment may be either continuous, intermittent, or batchwise. If both of the nitrogenous reactants are normally liquids, they may be mixed in any suitable reaction vessel that is resistant to the pressures that are to be employed, the hydrogenation catalyst, if in finely divided form, may be added to the mixture, and the mixture subjected to the action of the hydrogen under the aforesaid conditions of temperature and pressure. A mixture of the unsaturated diamine reactant and the donor reactant may be passed continuously over and/or through a bed of a suitable hydrogenation catalyst positioned in a suitable reaction chamber, in the presence of hydrogen gas under the aforesaid or equivalent conditions which favor hydrogenation reaction. If the second nitrogenous reactant is normally gaseous, it may be introduced into the reaction vessel either in the form of a solution in a suitable inert solvent, such as an inert organic solvent, or in the gaseous state. Because of the possibility that excessive reduction of the unsaturated diamine reactant may occur, it is desirable to minimize or to preclude excessive contact thereof with hydrogen under conditions which would favor hydrogenation reaction. This may be accomplished, for example, by bringing the unsaturated diamine and the second nitrogenous reactant into contact prior to introduction of the hydrogenation catalyst and/or the molecular hydrogen into the reaction vessel, by simultaneously introducing the two nitrogenous reactants into the reaction vessel, or in other effective ways. After sufficient time for completion of the reaction, the reaction mixture may be withdrawn from the reaction vessel, the catalyst removed, as by filtration, and the organic components of the mixture separated in any suitable manner, as by fractional distillation, or otherwise.

A preferred embodiment of the invention may be illustrated by the preparation of 1,3-propenediamines wherein the two amine nitrogen atoms are bonded to different numbers of hydrogen atoms, from N,N'-substituted 1,3-propenediamines which contain not more than one carbon-to-carbon multiple bond and wherein the two amino nitrogen atoms are bonded to equal numbers of hydrogen atoms, i. e., from N,N'-dialkyl-1,3-propenediamines wherein the two alkyl groups are the same, N,N,N',N'-tetraalkyl-1,3-propenediamines wherein the two amino groups are the same, and heterocyclic 1,3-propenediamines wherein each of the amino nitrogen atoms forms a part of a terminal heterocyclic ring, as in 1,3-bis(piperidino)propene and analogous heterocyclic 1,3-propenediamines. According to this preferred embodiment of the invention, the desired amount of the unsaturated diamine may be introduced into a suitable reaction vessel equipped with closable inlets and outlets, means for regulating the pressure within the reaction vessel, heating means, and a fractionating column arranged for reflux with withdrawal as desired of higher and/or lower boiling fractions. A primary or secondary saturated monoamine is added to the reaction vessel in an amount more than molecularly equivalent to the amount of the diamine, preferably from about 3 to about 8 moles of the monoamine per mole of the diamine. When it is desired to prepare a 1,3-propenediamine wherein the two nitrogen atoms are attached to different numbers of hydrogen atoms, the monoamine reactant preferably is a primary amine and the diamine reactant preferably is a 1,3-propenediamine in which the amino nitrogen atoms are tertiary. The contents of the reaction vessel are heated to a suitable temperature, preferably from about 40° C. to about 125° C., until reflux distillation commences, the pressure within the vessel being reduced if necessary to bring the reflux temperature to within the desired range. As the reflux distillation continues, the vapors leaving the liquid phase comprise a mixture of the monoamine reactant and the monoamine product of the interchange reaction. The vapors are fractionally condensed to separate the two monoamines. The monoamine formed in the interchange reaction is withdrawn, the remainder of the condensate being returned to the reaction vessel. The extent of the reaction may be determined and followed conveniently by measuring the amount of the monoamine reaction product that is thus withdrawn. When the amount of the monoamine withdrawn approaches theoretical, or when its evolution ceases, the heating may be stopped and the reaction mixture may be withdrawn from the reaction vessel. The desired product of the interchange reaction may be recovered from the mixture by fractional distillation or other suitable methods of separating the mixture into its components.

Numerous valuable derivatives of 1,3-propenediamine wherein both nitrogen atoms are substituted by alkyl groups, or one of the nitrogen atoms is contained in a terminal heterocyclic ring, and the other is substituted by an alkyl group, and wherein the two nitrogen atoms are attached to different numbers of hydrogen atoms, may be prepared in the foregoing manner.

When ammonia is employed as the second amino reactant, i. e., the donor reactant, the substituted 1,3-propenediamine may be placed in a suitable pressure-resistant vessel with a quantity of preferably anhydrous ammonia greater than the amount theoretically required for the reaction, preferably from about 5 to about 20 or more moles of ammonia per mole of the unsaturated diamine, and the mixture subjected to the action of molecular hydrogen in the presence of an active hydrogenation catalyst, such as Raney nickel, under conditions which favor hydrogenation reaction, suitable conditions having been described hereinbefore. Because of the relatively great volatility of the ammonia, it may be more convenient to confine the total reaction mixture in the reaction vessel, without removal of the monoamine product during the reactant. However, if desired the reaction mixture may be withdrawn either continuously or intermittently and subjected to a stripping or other suitable treatment effective for removing the monoamine product of the reaction, and thereafter returned to the reaction vessel for further treatment. It has been found that relatively large excesses of ammonia favor the desired interchange reaction, and that despite the presence of hydrogen and the existence of conditions which favor hydrogenation reaction, in such a manner there may be obtained highly effective yields of the desired saturated diamine, i. e., a propane diamine wherein at least one of the amino groups is primary, with minimum formation of the substituted 1,3-propanediamine that would be formed by direct hydrogenation of the initial unsaturated diamine reactant. By virtue of this discovery, highly effective conversions of disecondary and ditertiary 1,3-propenediames to 1,3-propanediamines wherein at least one of the amino nitrogen atoms is primary, may be realized. After completion of the reaction, i. e., when hydrogen absorption is complete, the saturated 1,3-propanediamine product may be recovered from the reaction mixture, preferably by fractional distillation, or according to other methods that have been referred to hereinbefore.

The following examples will illustrate certain of the numerous possible embodiments of the present invention. It will be appreciated that the examples are intended to be illustrative of and not limitative upon the scope of the invention as it is more broadly described and claimed herein. In the examples, the parts are by weight.

EXAMPLES

In the first three examples, there is illustrated the preparation of unsaturated diamines by interchange reaction between certain 1,3-alkenediamines in which the terminal amino groups are similar, and secondary and tertiary organic amines. In the first two examples the diamines that are produced are characterized by the difference in the identity of the terminal groups or atoms that are attached to the two amino groups in each of the products. In the third example there is illustrated an interchange reaction in which both of the amino groups of the unsaturated diamine were interchanged with the amino group of the organic monoamine.

*Example I.—Conversion of a disecondary unsaturated diamine with interchange of one of the amino groups*

Seventy-seven parts of N,N'-diisopropyl-1,3-propenediamine, prepared by the reaction of acrolein with isopropylamine, and 202 parts of 1,3-dimethylbutylamine were mixed in a reaction vessel that was equipped with a fractionating column arranged for reflux with withdrawal of lower boiling components at the stillhead. The mixture was heated at the reflux temperature and isopropylamine was withdrawn at the stillhead as it accumulated. The initial kettle temperature was 120° C. The heating was continued until no more isopropylamine was evolved from the reaction mixture, a period of 3 hours being required in this experiment. The remaining mixture was fractionally distilled. There were recovered 54 parts of N-(1,3-dimethylbutyl)-N'-isopropyl-1,3-propenediamine as the fraction distilling at 84° C. under a pressure of 4 millimeters of mercury.

*Example II.—Conversion of a ditertiary unsaturated diamine to a tertiary-secondary unsaturated diamine*

159 parts of N,N'-bis(diethyl)-1,3-propenediamine and 186 parts of aniline were mixed in the reaction vessel employed in Example I. The reaction vessel and the fractionating column were closed from the atmosphere and connected to a suitable pressure regulating means. The mixture was heated to the reflux temperature (60° C.) under 30 mm. pressure. Reflux distillation was continued and the diethylamine that was evolved from the mixture was collected and withdrawn at the stillhead. During the heating period, the reflux temperature rose gradually. When it reached 105° C., the pressure was further reduced and regulated so that the temperature did not exceed this value. When evolution of the diethylamine ceased, the reaction mixture was withdrawn from the reaction vessel and fractionally distilled. N-phenyl-N'-diethyl-1,3-propenediamine was recovered in a conversion of 39 per cent, based upon the amount of the unsaturated diamine reactant employed, and in a yield of 39 per cent based on the amount of the unsaturated diamine consumed. The N-phenyl-N'-diethyl-1,3-propenediamine distilled at 92° C. under a pressure of 0.5 millimeter of mercury and had a refractive index $(n_D^{20})$ of 1.4720.

*Example III.—Conversion of a disecondary unsaturated diamine to a ditertiary unsaturated diamine*

A mixture of 75 parts of N,N'-diisopropyl-1,3-propenediamine and 172 parts of piperidine was heated to reflux in a reaction vessel that was equipped with a fractionating column arranged for reflux with withdrawal of lower boiling fractions at the stillhead. The initial kettle temperature at reflux was 101° C. The heating was continued over a period of 3 hours, and isopropylamine was withdrawn at the stillhead as it accumulated. At the end of this time, the kettle temperature had risen to 120° C. The contents of the vessel were removed and fractionally distilled. There were recovered 75 parts of 1,3-bis(piperidino)propene distilling at 100° C. under a pressure of 0.5 millimeter of mercury.

In the following examples there is illustrated the simultaneous treatment of an unsaturated diamine of the herein defined class with ammonia and with primary and secondary organic amines and with hydrogen, to obtain the saturated diamine formed by interchange of one of the amino groups of the unsaturated diamine with that of the second nitrogenous reactant and saturation of the olefinic bond.

*Example IV.—Conversion of a ditertiary unsaturated diamine to a tertiary-primary saturated diamine*

A solution of 31 parts of acrolein in 50 parts of diethyl ether was added, with stirring, to a mixture of 94 parts of piperidine, 100 parts of diethyl ether and 50 parts of powdered potassium carbonate at 5° C. to 10° C. The mixture was filtered and the ether was evaporated from the mixture, leaving a residue of 109 parts. The 1,3-bis(piperidino)propene thus prepared, 48 parts of anhydrous ammonia, and 5 parts of Raney nickel hydrogenation catalyst suspended in 10 parts of methyl alcohol, were introduced into a pressure resistant reaction vessel. The reaction vessel was closed from the atmosphere and subjected at 100° C. to the action of hydrogen gas at a pressure of 1600 pounds per square inch. After 2 hours the contents of the vessel were withdrawn and fractionally distilled. There were obtained 48 parts of 3-piperidinopropylamine, corresponding to a conversion of 61% based upon the amount of acrolein employed. The 3-piperidinopropylamine was found to contain 67.17 per cent C, 12.79 per cent H, and 19.45 per cent N, compared to calculated values of 67.6 per cent, 12.7 per cent and 19.7 per cent, respectively. Its specific gravity (20/4) was found to be 0.9024, and its refractive index $(n_D^{20})$ was found to be 1.4757.

*Example V.—Conversion of a ditertiary unsaturated diamine to a tertiary-secondary saturated diamine*

A mixture of 80 parts of 1,3-bis(piperidino)-propene that had been prepared according to the method used in Example IV, 69 parts of isopropylamine and 8 parts of a slurry of Raney nickel hydrogenation catalyst in methanol containing 5 parts of the catalyst, was subjected at 100° C. for two hours to the action of hydrogen gas under a pressure of 1000 pounds per square inch. The catalyst was removed from the mixture by filtration and the filtrate was fractionally distilled. N-isopropyl-3-piperidinopropylamine, 17 parts, was recovered as the fraction distilling at 77° C. to 80° C. under a pressure of 3 millimeters of mercury. The sample of this compound thus prepared was found to have the following characteristics:

|  | Found | Calculated $C_{11}H_{24}N_2$ |
|---|---|---|
| Equivalent Weight | 93 | 92 |
| Refractive index $(n_D^{20})$ | 1.4617 |  |
| Density $d_4^{20}$ | 0.8661 |  |
| Per cent C | 71.32 | 71.75 |
| Per cent H | 13.12 | 13.05 |
| Per cent N | 14.85 | 15.20 |

In addition to the N-isopropyl-3-piperidinopropylamine, there were recovered 30 parts of 1,3-bis(piperidino)propane, apparently formed by the direct hydrogenation of the 1,3-bis(piperidino)propene.

*Example VI.—Conversion of a ditertiary unsaturated diamine to a tertiary-secondary saturated diamine*

A mixture of 79 parts of 1,3-bis(piperidino)-propene that had been prepared according to the method used in Example V, 70 parts of allylamine and 8 parts of a slurry of Raney nickel catalyst in methanol containing 5 parts of the catalyst, was subjected at 100° C. for two hours to the action of hydrogen gas under a pressure of 1000 pounds per square inch. Upon fractional distillation of the resultant mixture, there were recovered in a conversion of 51%, 36 parts of N-propyl-3-piperidinopropylamine having the characteristics shown in the following table.

N-PROPYL-3-PIPERIDINOPROPYLAMINE

|  | Found | Calcd. $C_{11}H_{24}N_2$ |
|---|---|---|
| Equivalent Weight | 91.4 | 92 |
| $n_D^{20}$ | 1.4638 |  |
| Sp. Gr. 20/4 | 0.8690 |  |
| Carbon, percent w | 71.66 | 71.75 |
| Hydrogen, percent w | 13.12 | 13.05 |
| Nitrogen, percent w | 15.4 | 15.20 |
| Boiling Range, °C | 86–88 (3 mm.) |  |

Under the conditions of this experiment, the olefinic bond in the allyl group apparently was saturated with hydrogen. It is quite likely that under other, suitable conditions, the reaction could have been effected without conversion of this olefinic bond to a saturated bond.

*Example VII.—Conversion of a disecondary unsaturated diamine to a secondary-primary saturated diamine*

A solution of 28 parts of acrolein in 32 parts of diethyl ether was added with stirring to 150 parts of isopropylamine at 5° C. to 10° C. Excess amine and the ether were evaporated from the mixture under reduced pressure, leaving a residue of 90 parts of crude N,N'-diisopropyl-1,3-propenediamine. A mixture of 90 parts of the N,N'-diisopropyl-1,3-propenediamine, 52 parts of anhydrous ammonia, and 5 parts of Raney nickel catalyst was subjected at 100° C. for two hours to the action of hydrogen gas under a pressure of 2000 pounds per square inch. Upon fractional distillation of the resultant mixture, there were recovered, in a conversion of 64% based on the acrolein employed, 37 parts of N-isopropyl-1,3-propanediamine having the characteristics shown in the following table.

N-ISOPROPYL-1,3-PROPANEDIAMINE

|  | Found | Calcd. $C_6H_{16}N_2$ |
|---|---|---|
| Carbon, per cent w | 62.04 | 62.0 |
| Hydrogen, per cent w | 13.76 | 13.8 |
| Nitrogen, per cent w | 24.45 | 24.2 |
| Equivalent Weight | 58 | 58 |
| Sp. Gr. 20/4 | 0.8303 |  |
| $n_D^{20}$ | 1.4417 |  |
| Boiling Point, °C | 162 (760 mm.) |  |

*Example VIII.—Conversion of a disecondary unsaturated diamine to a disecondary saturated diamine with interchange of one of the amino groups*

A mixture of 82.5 parts of N,N'-diisopropyl-1,3-propenediamine which had been prepared according to the method used in Example VII, 82 parts of ethylamine, and 5 parts of Raney nickel catalyst was subjected at 100° C. for two hours to the action of hydrogen gas under a pressure of 1000 pounds per square inch. Upon fractional distillation of the resultant mixture, there were recovered 36 parts of N-isopropyl-N'-ethyl-1,3-propanediamine having the characteristics shown in the following table.

N-ISOPROPYL-N'-ETHYL-1,3-PROPANEDIAMINE

|  | Found | Calcd. $C_8H_{20}N_2$ |
|---|---|---|
| Carbon, per cent w | 66.74 | 66.7 |
| Hydrogen, per cent w | 13.98 | 13.9 |
| Nitrogen, per cent w | 19.20 | 19.4 |
| Equivalent Weight | 72 | 72 |
| Sp. Gr. 20/4 | 0.8101 |  |
| $n_D^{20}$ | 1.4348 |  |
| Boiling Point, °C | 183 (760 mm.) |  |

We claim as our invention:

1. A process for converting by replacing an N-substituted amino group by a dissimilar N-substituted amino group N,N'-substituted 1-alkene-1,3-diamine derivatives to other N,N'-substituted 1-alkene-1,3-diamine derivatives which comprises heating in liquid phase a mixture comprising an N,N'-substituted 1-alkene-1,3-diamine derivative and an organic amine of the class consisting of the primary and the secondary organic amines having directly linked through the nitrogen atom to an atom of hydrogen an N-substituted amino group dissimilar to the N-substituted amino groups of said diamine, the heating being conducted at a temperature of from about 40° C. to about 200° C., said organic amine reactant being initially present in mole excess over said diamine reactant, whereby there is produced an N,N'-substituted 1-alkene-1,3-diamine derivative wherein an amino group is the same as said N-substituted amino group of said organic amine reactant.

2. A process for converting by replacing an N-substituted amino group by a dissimilar N-substituted amino group N,N'-substituted 1,3-propenediamine derivatives to other N,N'-substituted 1,3-propenediamine derivatives which comprises heating in liquid phase at a temperature of from about 50° C. to about 125° C. in the absence of catalysts a mixture of said N,N'-substituted 1,3-propenediamine derivative and an organic amine of the class consisting of the primary and the secondary organic amines having directly attached through an amino nitrogen atom to an atom of hydrogen an amino group which differs in substitution from the N-substituted amino groups of said diamine reactant and recovering from the mixture the converted N,N'-substituted 1,3-propenediamine derivative.

3. The method of preparing a 1-alkene-1,3-diamine wherein one of the amino nitrogen atoms is tertiary and the other amino nitrogen atom is secondary which comprises heating in liquid phase a 1-alkene-1,3-diamine wherein both of the amino nitrogen atoms are tertiary with a primary organic amine in a molar ratio of from about 2/1 to about 1/20 at a temperature of from about 40° C. to about 200° C.

4. A process for effecting the replacement by a dissimilar alkyl group of an N-alkyl group of an N,N'-dialkyl-1-alkene-1,3-diamine, which comprises heating together in liquid phase at a temperature of from about 50° C. to about 125° C. said N,N'-dialkyl-1-alkene-1,3-diamine and a mole excess of an alkyl primary amine wherein the N-alkyl group is dissimilar to the N-alkyl groups of said diamine.

5. The method of preparing N-isopropyl-N'-(1,3-dimethylbutyl)-1,3-propenediamine which comprises heating at boiling with reflux condensation of evolved vapors a mixture of N,N'-diisopropyl-1,3-propenediamine and 1,3-dimethylbutylamine, continuously separating from the evolved vapors and withdrawing from the reaction zone isopropylamine while continuing the heating, and recovering N-isopropyl-N'-(1,3-dimethylbutyl)-1,3-propenediamine from the remaining mixture.

6. A process for converting by replacing an N-substituted amino group by a dissimilar N-substituted amino group N,N'-substituted 1-alkene-1,3-diamine derivatives to other N,N'-substituted 1-alkene-1,3-diamine derivatives which comprises heating in liquid phase a mixture comprising an N,N'-substituted 1-alkene-1,3-diamine derivative and a secondary organic amine having directly linked through the nitrogen atom to an atom of hydrogen an N-substituted amino group dissimilar to the N-substituted amino groups of said diamine, the heating being conducted at a temperature of from about 40° C. to about 200° C., said secondary organic amine reactant being initially present in mole excess over said diamine reactant, whereby there is produced an N,N'-substituted 1-alkene-1,3-diamine derivative wherein an amino group is the same as said N-substituted amino group of said secondary organic amine reactant.

7. A process for converting by replacing an N-substituted amino group by a dissimilar N-substituted amino group N,N'-substituted 1-alkene-1,3-diamine derivatives to other N,N'-substituted 1-alkene-1,3-diamine derivatives which comprises heating in liquid phase at a temperature of from about 40° C. to about 200° C. a mixture of said N,N'-substituted 1-alkene-1,3-diamine derivative and a saturated hydrocarbon primary amine having directly attached through amino nitrogen to an atom of hydrogen an amino group which differs in substitution from the N-substituted amino groups of said diamine reactant and recovering from the mixture the converted N,N'-substituted 1-alkene-1,3-diamine derivative.

8. A process for converting by replacing an N-substituted amino group by a dissimilar N-substituted amino group N,N'-substituted 1-alkene-1,3-diamine derivatives to other N,N'-substituted 1-alkene-1,3-diamine derivatives which comprises heating in liquid phase at a temperature of from about 40° C. to about 200° C. a mixture of said N,N'-substituted 1-alkene-1,3-diamine derivative and a saturated hydrocarbon secondary amine having directly attached through amino nitrogen to an atom of hydrogen an amino group which differs in substitution from the N-substituted amino groups of said diamine reactant and recovering from the mixture the converted N,N'-substituted 1-alkene-1,3-diamine derivative.

9. A process for converting by replacing an N-substituted amino group by a dissimilar N-substituted amino group N,N'-substituted 1-alkene-1,3-diamine derivatives to other N,N'-substituted 1-alkene-1,3-diamine derivatives which comprises heating in liquid phase a mixture comprising an N,N'-substituted 1-alkene-1,3-diamine derivative and an organic amine of the class consisting of the primary and the secondary organic amines having directly linked through the nitrogen atom to an atom of hydrogen an N-substituted amino group dissimilar to the N-substituted amino groups of said diamine, the heating being conducted at a temperature of from about 40° C. to about 200° C., whereby there is produced an N,N'-substituted 1-alkene-1,3-diamine derivative wherein an amino group is the same as said N-substituted amino group of said organic amine reactant.

HARRY DE V. FINCH.
SEAVER A. BALLARD.

REFERENCES CITED

The following references are of record in the file of this patent:

UNITED STATES PATENTS

| Number | Name | Date |
|---|---|---|
| 2,045,574 | Adkins | June 30, 1936 |
| 2,145,242 | Arnold | Jan. 31, 1939 |
| 2,374,485 | Haury | Apr. 24, 1945 |
| 2,415,020 | Morey | Jan. 28, 1948 |

OTHER REFERENCES

Mannich et al.: "Ber. deut. chem." vol. 69, pp. 2112-2123.

Mannich et al.: "Chem Abstracts," vol. 31, pp. 2216 (1937).